No. 788,453. PATENTED APR. 25, 1905.
J. P. CLEAL & A. MACAULEY.
CASH REGISTER.
APPLICATION FILED APR. 23, 1900.

11 SHEETS—SHEET 4.

Witnesses
Wm. McCarthy
William Hugg

Inventors
Joseph P Cleal
Alvan Macauley
By Alvan Macauley
Attorney

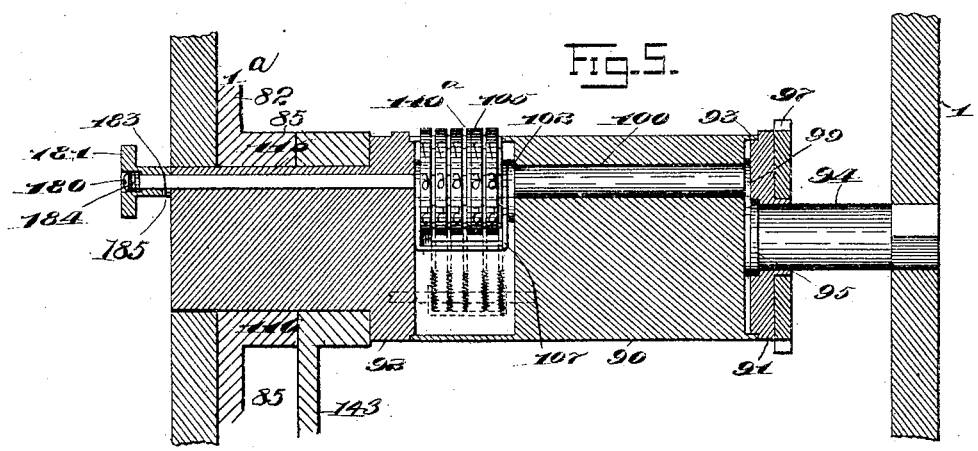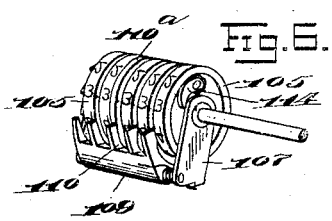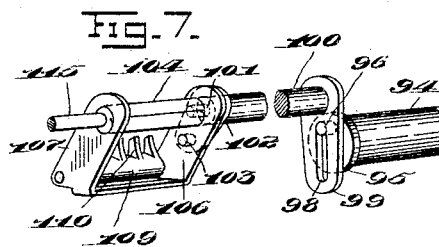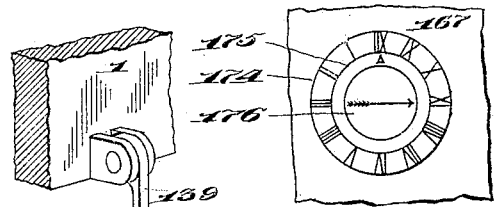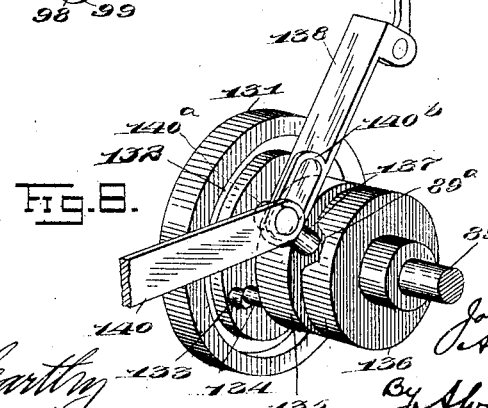

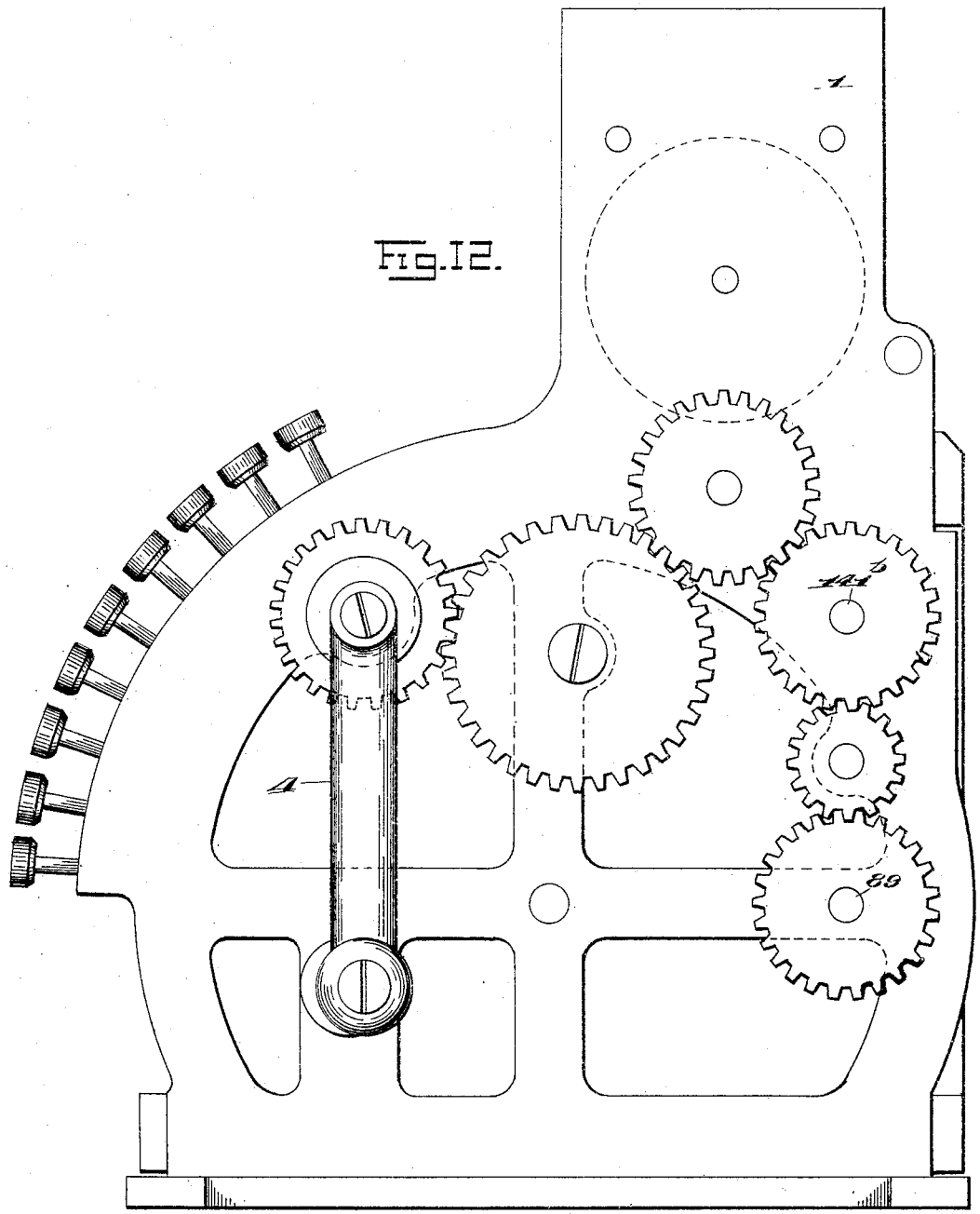

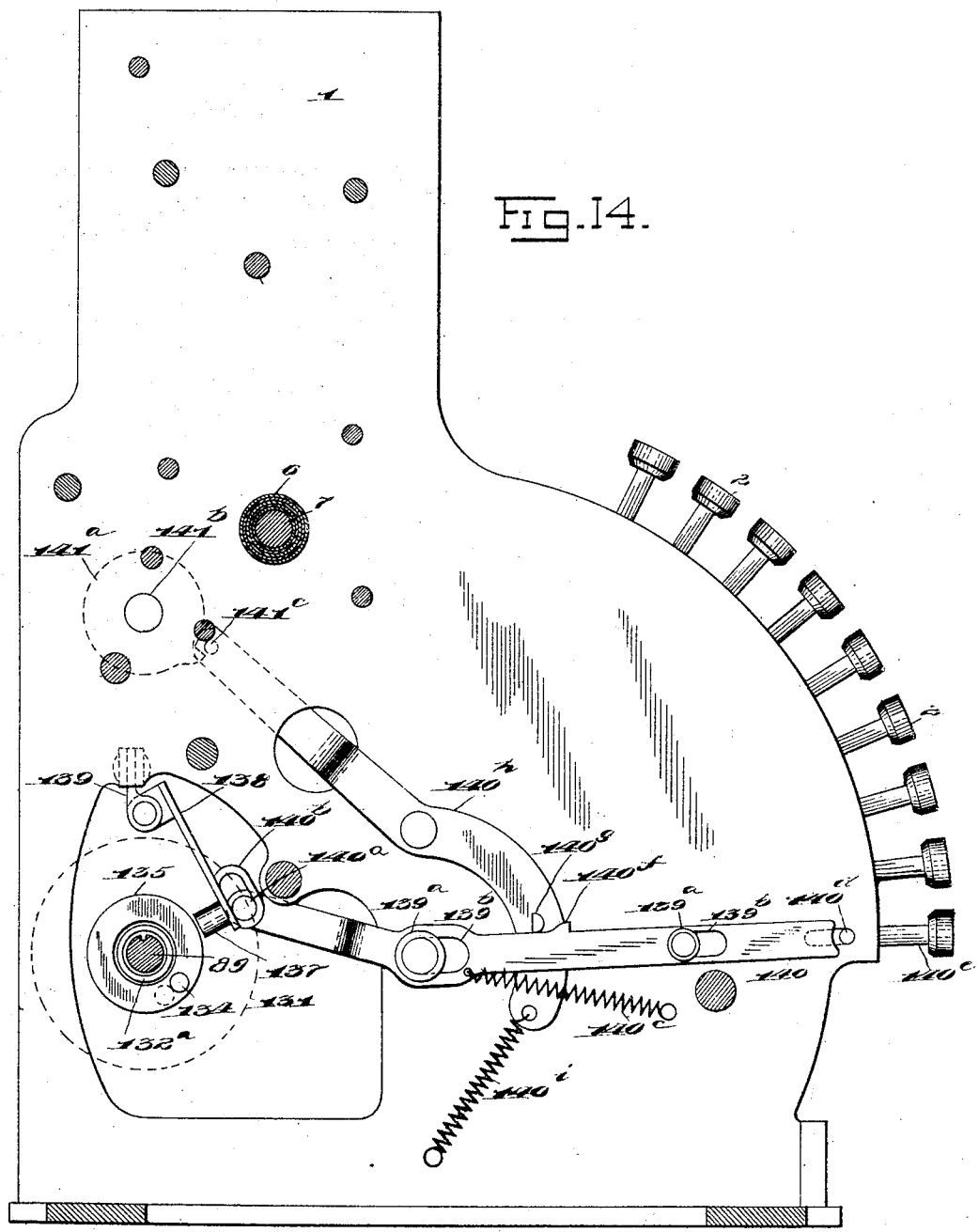

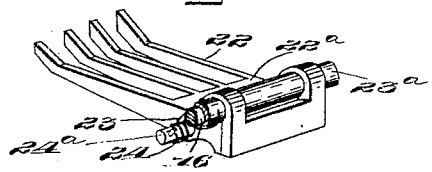
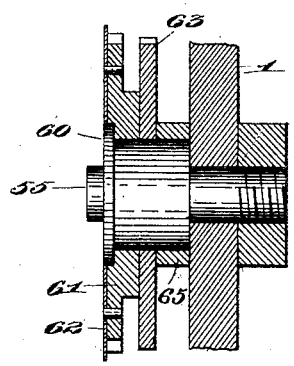
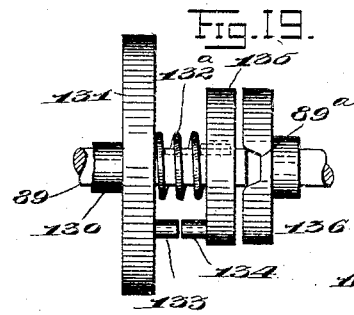
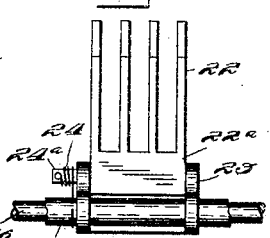
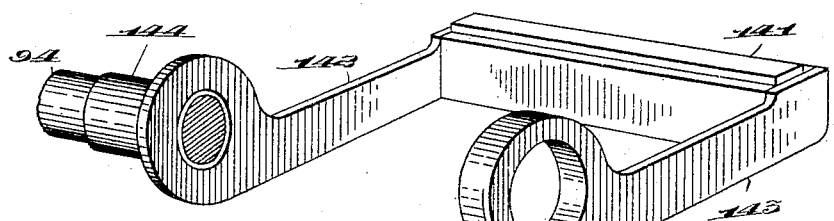
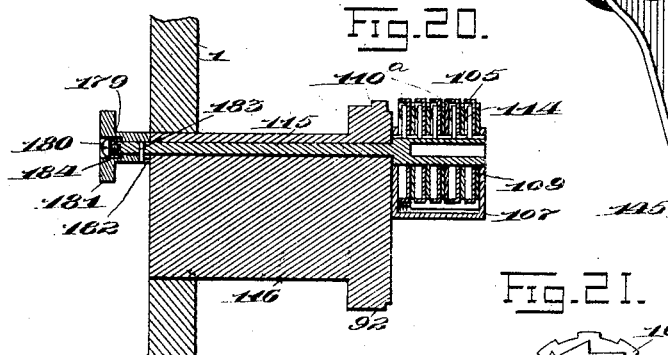
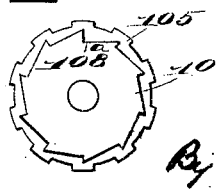

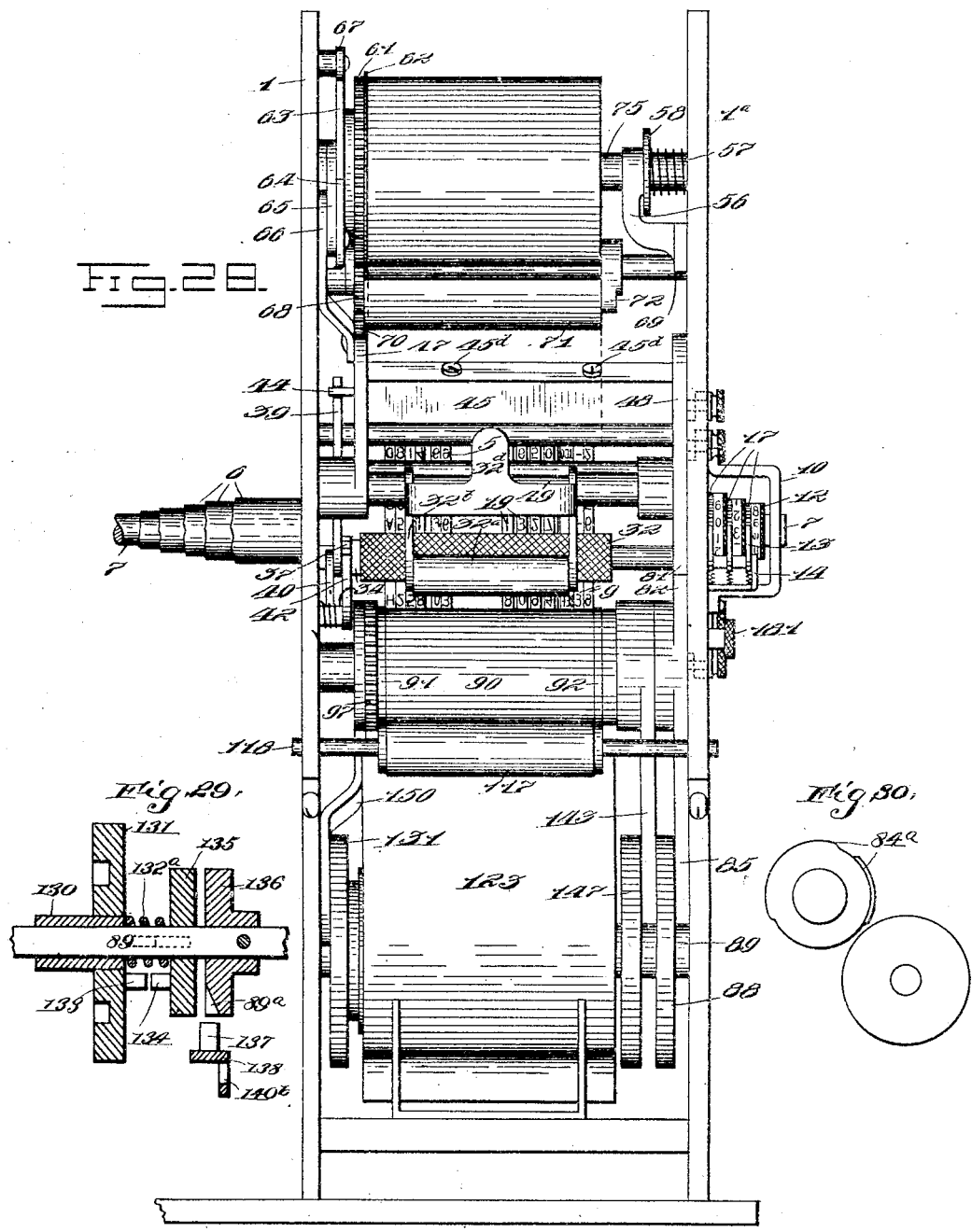

No. 788,453. Patented April 25, 1905.

UNITED STATES PATENT OFFICE.

JOSEPH P. CLEAL AND ALVAN MACAULEY, OF DAYTON, OHIO, ASSIGNORS TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 788,453, dated April 25, 1905.

Application filed April 23, 1900. Serial No. 13,873.

*To all whom it may concern:*

Be it known that we, JOSEPH P. CLEAL and ALVAN MACAULEY, citizens of the United States, residing at Dayton, in the county of Montgomery and State of Ohio, have invented certain new and useful Improvements in Cash-Registers, of which we declare the following to be a full, clear, and exact description.

This invention relates to improvements in cash-registers, and has more particular relation to improvements in machines of the type which print designating characters for a transaction on both a record-strip and a check, as shown in the patent to Cleal and Reinhard, No. 580,378, patented April 13, 1897.

One of the several objects of the invention is to provide a cash-register with an improved time-stamp or time-printing device whereby the time of each sale is printed in connection with the amount of the same.

Another object is to provide two independent consecutive-numbering devices for printing the number of checks issued and also the number of customers or transactions irrespective of the number of checks.

Figure 1:
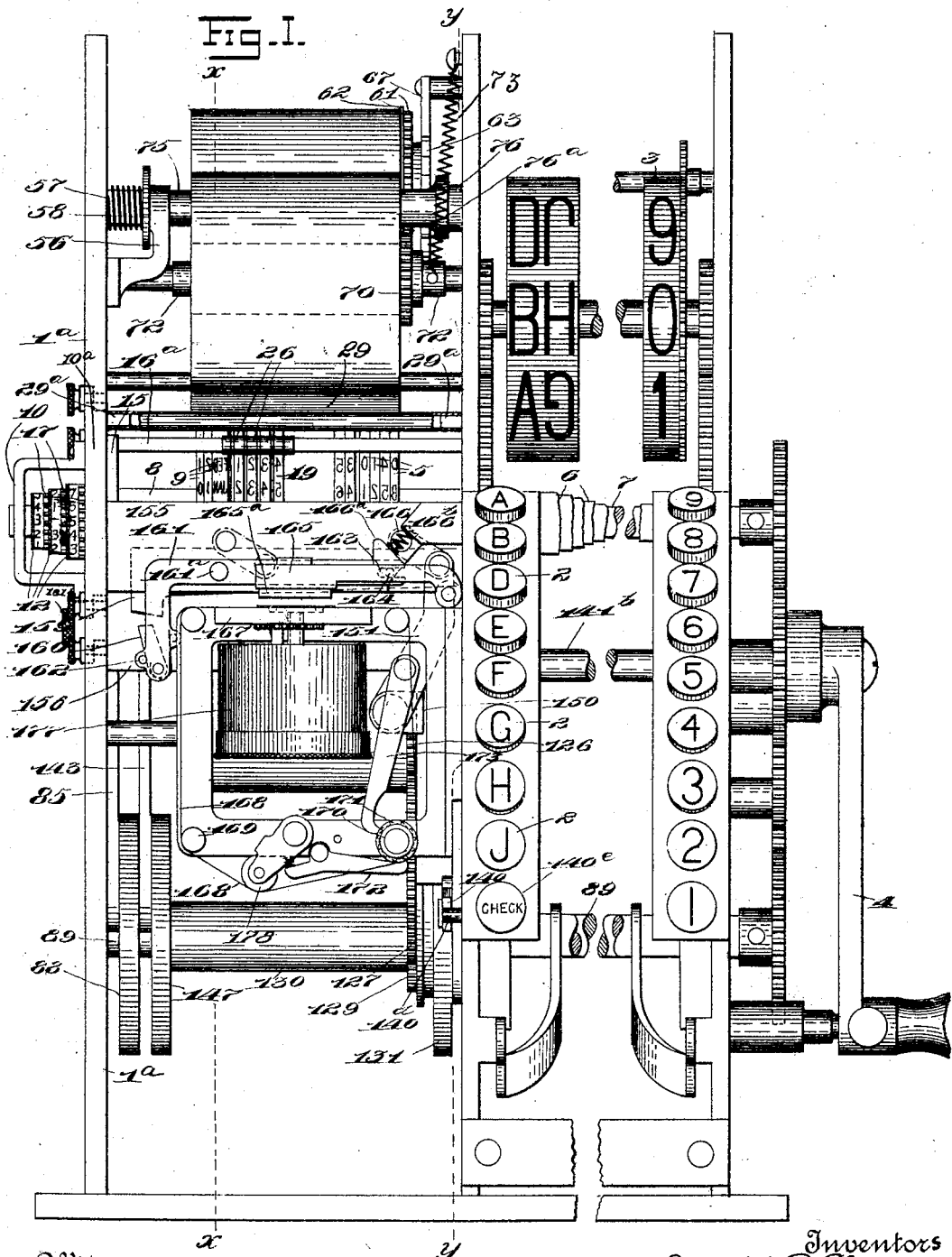
Figure 2:
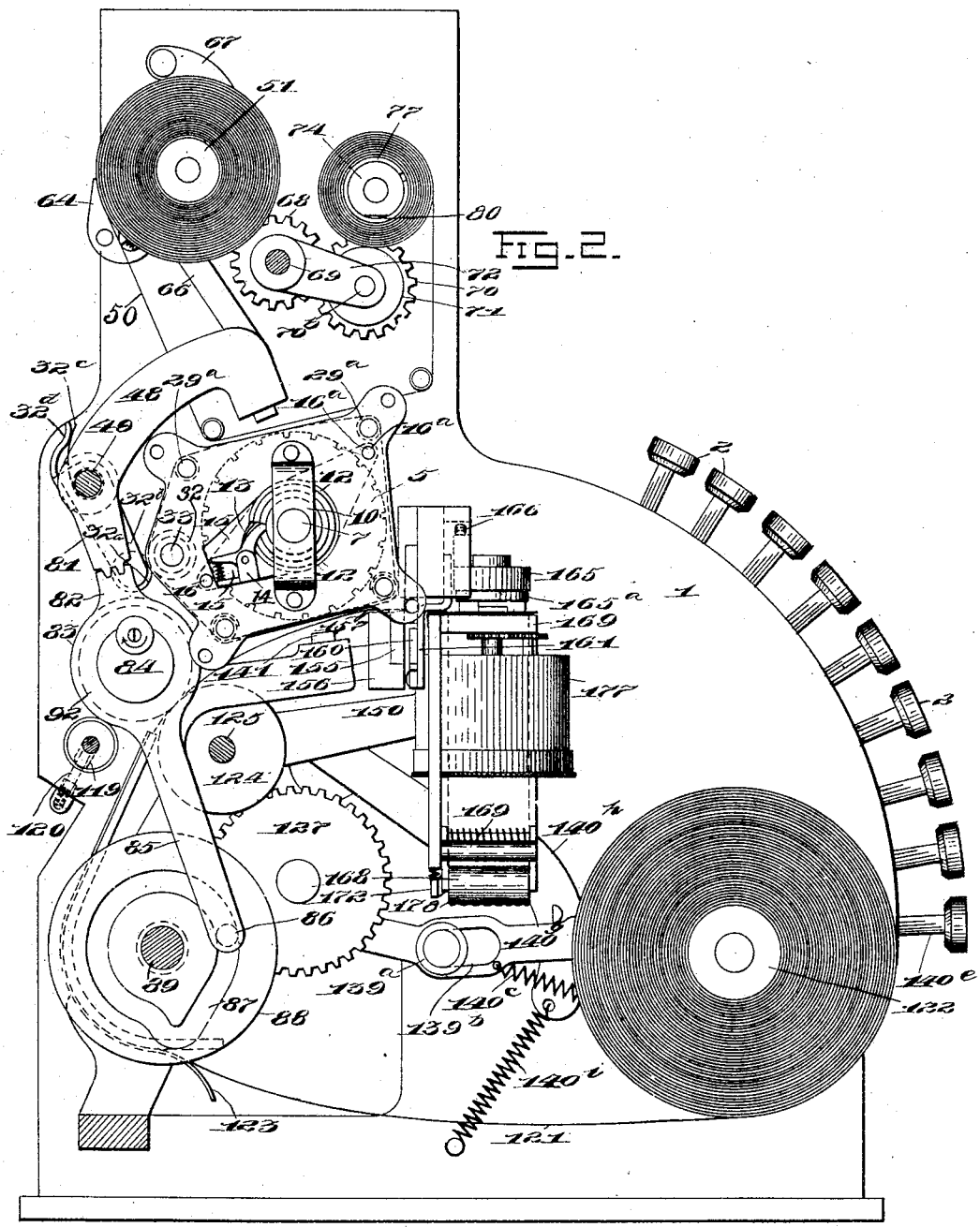
Figure 3:
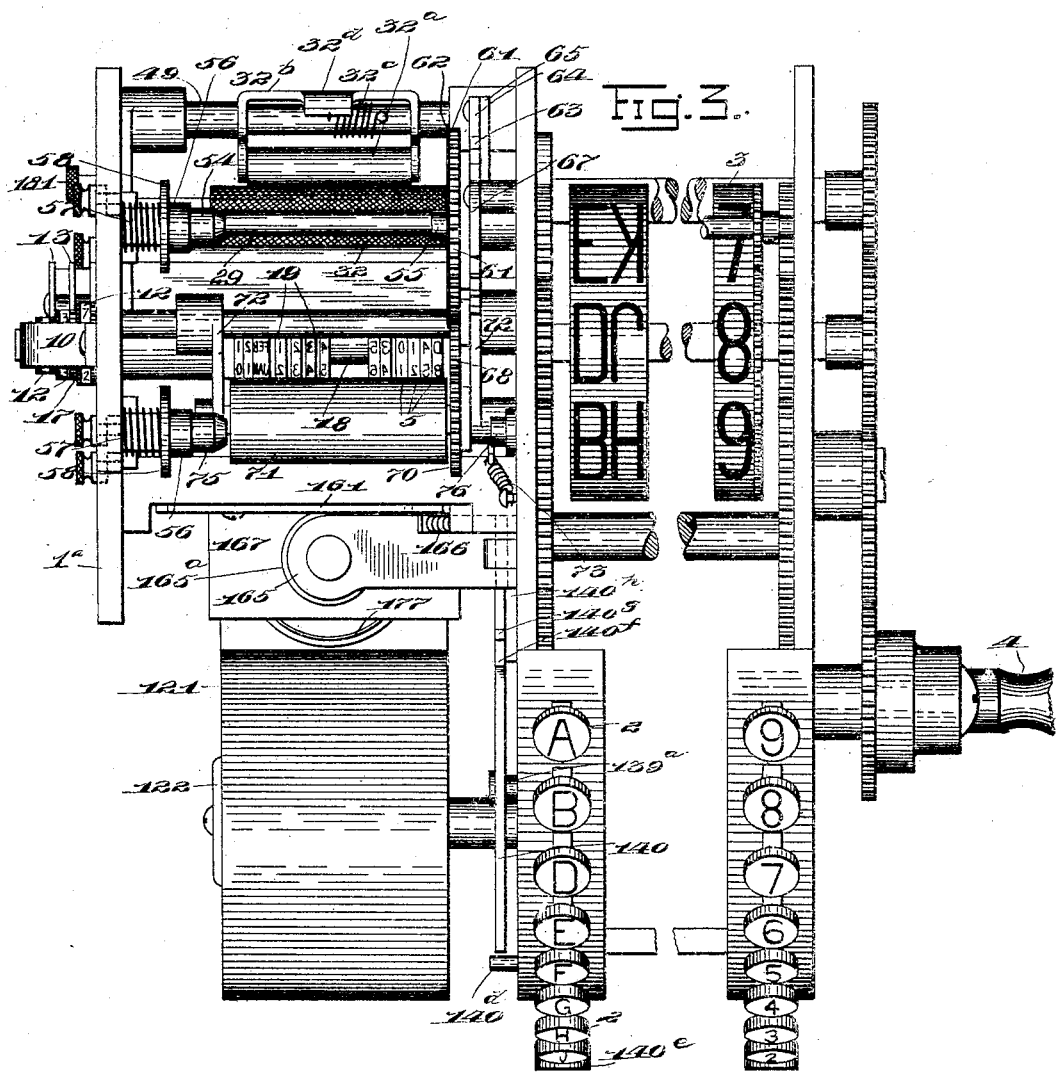
Figure 4:
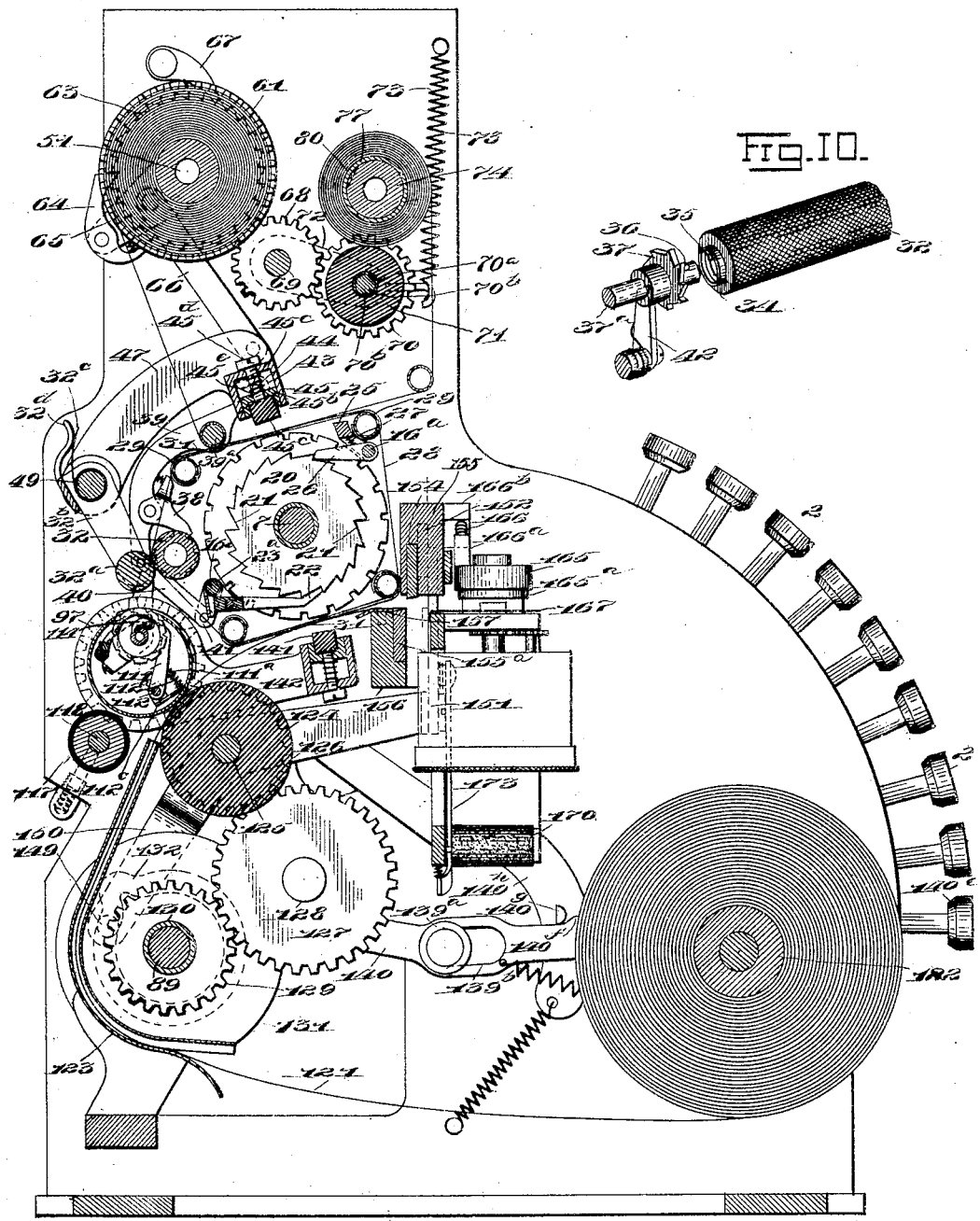
Figure 10:
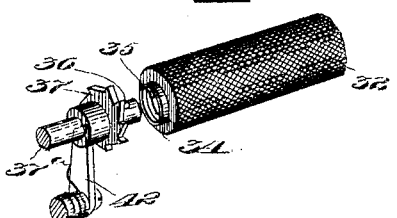
Figure 11:
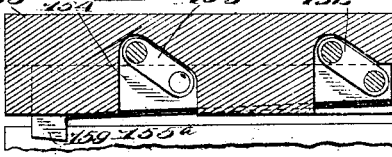
Figure 13:
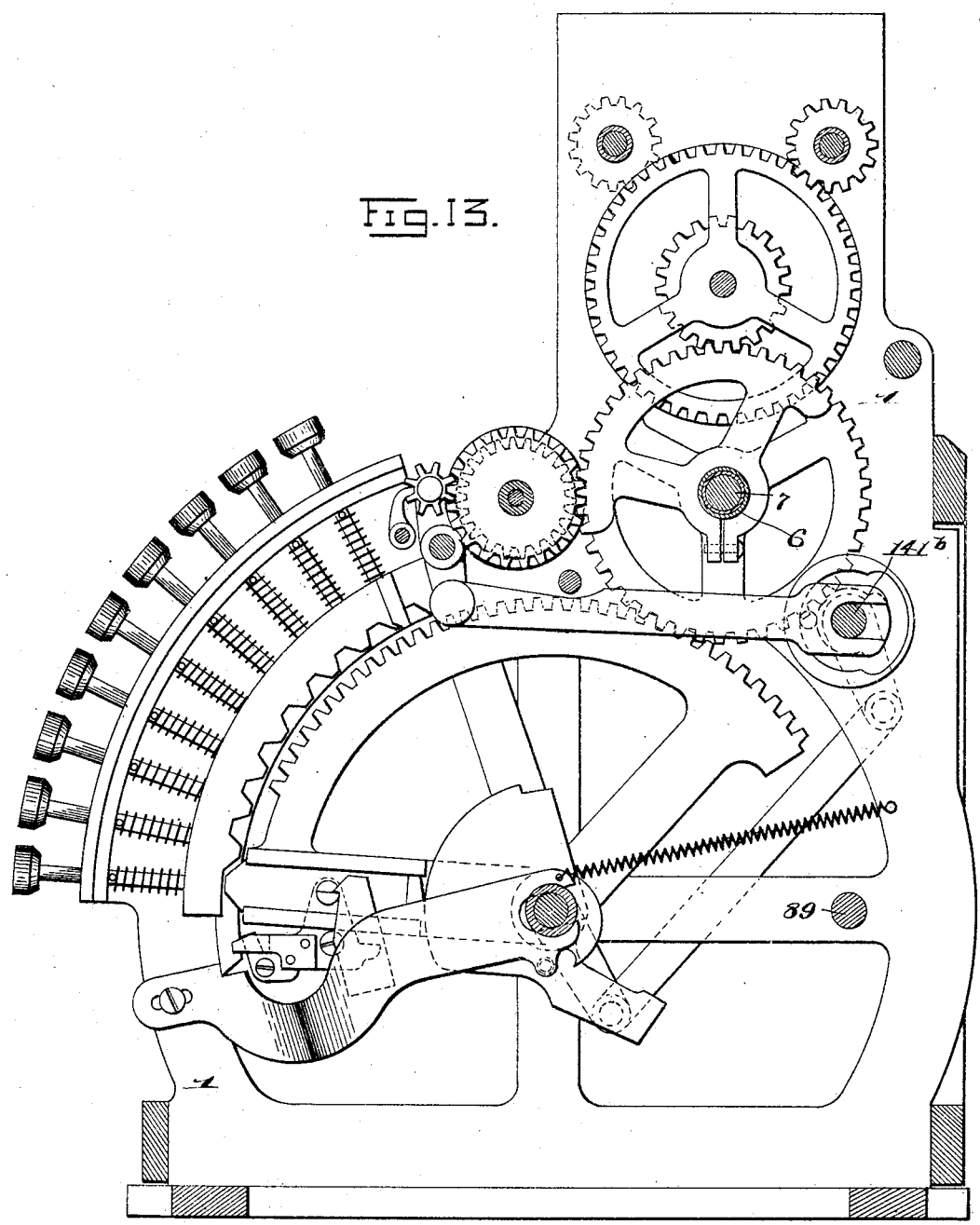
Figure 23:
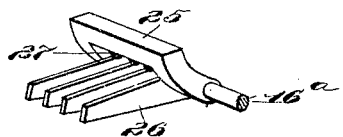
Figure 25:
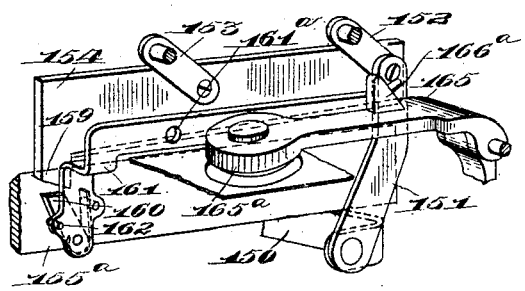
Figure 24:
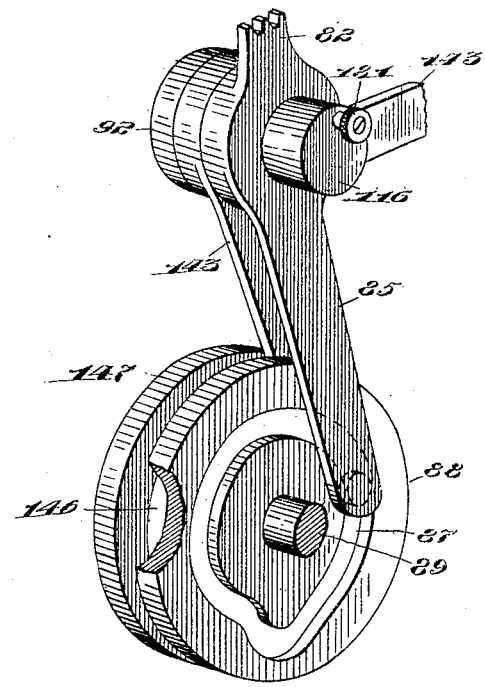
Figure 26:
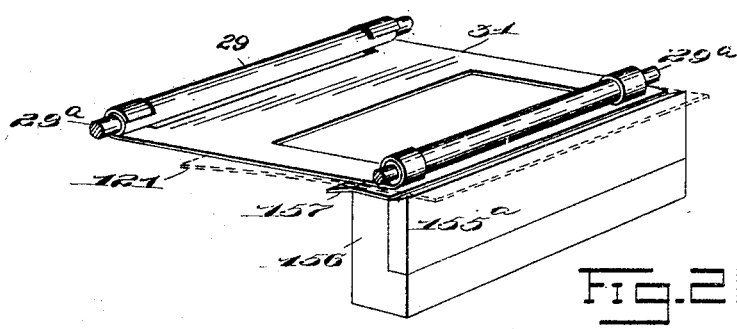

In the appended drawings, forming part of this specification, Figure 1 represents a front elevation of the devices embodying our invention applied to a cash-register of the type above mentioned, the latter being partly broken away and the cabinet removed. Fig. 2 represents a side elevation of the same with a portion of the frame removed. Fig. 3 represents a top plan view of the devices as shown in Fig. 1. Fig. 4 represents a vertical transverse section through our improved devices on the line $x\ x$ of Fig. 1. Fig. 5 represents a detail vertical longitudinal section, partly in elevation, through the consecutive-number-printing drum. Fig. 6 represents an enlarged detail perspective view of the consecutive-number-printing wheels and their pawls removed from their drum. Fig. 7 represents an enlarged detail perspective view, partly broken away, of the operating-pawl and coöperating parts for this set of the consecutive-numbering wheels. Fig. 8 represents an enlarged detail perspective view of a clutch and its shifting devices for controlling the check-issuing mechanism. Fig. 9 represents a detail top plan view of the printing-types of the clock attachment. Fig. 10 represents an enlarged detail perspective view, partly broken away, of the ink-ribbon-feeding roller and its actuating devices. Fig. 11 represents a detail vertical section through the check-knife-supporting devices. Fig. 12 represents an elevation of the machine to which our invention is applied, taken at the side opposite from that shown in Fig. 2, the cash-drawer and cabinet being removed. Fig. 13 represents a central vertical transverse section through a machine of the class before mentioned. Fig. 14 represents a vertical transverse section through the machine on the line $y\ y$ of Fig. 1. Fig. 15 represents an enlarged detail perspective view of the detail-strip-feeding roller and its paper-clamping sleeve. Fig. 16 represents an enlarged detail perspective view of the operating-pawls for the large duplicate-printing consecutive-numbering wheels. Fig. 17 represents a detail transverse section through the operating-gear for the detail-strip-winding roller. Fig. 18 represents an enlarged detail perspective view of the lower platen and its supporting and operating arms. Fig. 19 represents a detail front elevation of the clutch and coacting parts shown in Fig. 8. Fig. 20 represents a detail vertical section through the devices for turning the consecutive-numbering wheels in the revolving drum to zero. Fig. 21 represents a side elevation of one of the consecutive-numbering wheels and its ratchet out of the drum. Fig. 22 represents a detail front elevation of the large consecutive-numbering wheels, the dating-wheels, and the nested sleeves upon which they are mounted. Fig. 23 represents a detail perspective view of the retaining-pawls and coöperating parts for the large consecutive-numbering wheels. Fig. 24 represents a perspective view of the drum-cap, the platen levers or arms journaled thereon, and the cams for operating said levers, one of the latter being broken away. Fig. 25 represents an enlarged detail perspective view of the check-knives, time-stamp platen, and coacting parts. Fig. 26 represents an enlarged detail perspective view of the guard and guide plates for the check-strip. Fig. 27 is a plan view of the devices shown in Fig. 16. Fig. 28 is a rear elevation view of our improved printing mechanism. Fig. 29 is a detail vertical section of the clutch mechanism for throwing the check devices on and off, and Fig. 30 represents a detail end elevation of the feeding and printing drum for the check-strip, showing the feeding-flanges.

In connection with our invention we have illustrated a machine similar to that included in the patent above mentioned, and we will therefore refer to said patent for a detail description of the several parts of said machine which are not hereinafter particularly described.

In the said drawings, 1 represents the frame of the machine; 2, the special clerk's keys; 3, the regular indicators, and 4 the operating-handle.

The several parts of the machine, including the keys, indicators, registering mechanism, and amount-printing wheels, are substantially as described in the said patent.

The amount or value printing wheels 5, as shown and described in said patent, are supported upon a series of nested sleeves 6, which extend to the left outside the frame 1 of the machine and are mounted upon a transverse shaft 7. They are connected to the register-operating devices, so as to be moved different distances, according to the amounts registered, in a manner now well known in the art. Said shaft 7 at its left-hand end further supports a second series of nested sleeves 8, which extend from outside the printer-frame 1ª toward the right and (see Fig. 22) carry date-printing type-wheels 9 at their inner ends. The outer end of the shaft 7 is supported in a spider-frame 10, (see Figs. 1 and 2,) which is removably secured to the side plate of the printer-frame 1ª. The outer ends of said sleeves 8 are provided, respectively, with thumb-wheels 12, (see Figs. 1 and 2,) having numbered and milled peripheries, whereby they may be turned to adjust the sleeves 8 and wheels 9 to the desired positions. In order to temporarily hold said wheels 9 in the positions to which they are turned, we provide a series of spring-pressed pawls 13 (see Figs. 2 and 3) and mount the same on a fixed bracket 14, passing through the printer-frame 1ª, which is secured to a plate 15, through which passes the shaft 7 and sleeves 8. The plate has apertures at its opposite ends for the reception of transverse rods 16 and 16ª, whereby said plate is prevented from turning on said sleeve. The said pawls 13 are arranged to engage star-wheels 17, which are secured to the outer ends of the respective sleeves 8, so as to hold them in the positions to which they are adjusted and also act as alining means for bringing the types of the wheels 9, mounted on said sleeves, into exact printing positions. In addition to the above the said shaft 7 also supports a sleeve 18, (see Fig. 22,) extending between the date-printing wheels 9 and the amount-printing wheels 5, upon which is journaled a series of consecutive-number-printing wheels 19, having printing-types upon their peripheries. The types of these numbering-wheels, as well as of the aforesaid dating-wheels, are arranged in series, two duplicate series for each wheel, so that duplicate impressions may be made from each wheel, one from above and the other from diametrically below. Each of the said wheels 19 is provided with a ratchet-wheel 20 fast thereto, (see Fig. 4,) and each of said ratchet-wheels is formed at its periphery with two deep notches or recesses 21, arranged upon diametrically opposite sides of said wheel. The first or units wheel of the series of wheels 19 is turned forward one space at each operation of the machine by one of a series of pawls 22. These pawls are formed integral with a block 22ª, (see Figs. 16 and 27,) which is pivotally mounted between lugs 23, which are fast to a sleeve 23ª, mounted on the rock-shaft 16. The operating ends of these pawls are of graduated inclinations. The most inclined coöperates with the units-wheel, the next with the tens-wheel, and so on through the series.

By the above means when the pawl of the units-wheel is contacting with the teeth of its respective ratchet-wheel all the remaining pawls which are less inclined are held out of engagement with their respective ratchet-wheels. When the units-wheel has made a half-revolution, which is equal to ten units, its respective pawl passes into one of the deep notches 21, and thus allows sufficient upward movement of said pawl to bring the tens-pawl also into engagement with its ratchet-wheel. The same operation is repeated with respect to the hundreds-wheel when the tens-wheel has made a half-revolution, and so on through the series in a manner well known in the art. The pawls are normally under the tension of a coiled spring 24, which surrounds the pivot-pin 24ª, upon which the block 22ª is rigidly mounted, and is connected to the same, the free end of said spring bearing under the sleeve 23ª. The latter is rocked once during each movement of the machine by devices hereinafter more fully described, and thus imparts a reciprocating movement to the pawls which engage the ratchet-wheels of the numbering type-wheels to advance them one space, as above described.

The shaft or rod 16ª, which is rigidly fixed in the printer-frame, is provided with a yoke-shaped frame 25 fast thereto (see Fig. 23) and a series of stop-pawls 26, pivoted independently of each other on said rod between the arms of the said yoke and held to engagement with the respective ratchet-wheels by coil-springs 27, interposed between the said pawls and the said yoke. By means of the above-described stop-pawls any backward movement of the consecutive-numbering wheels is absolutely prevented.

A broad endless inking-ribbon 28 (see Fig. 4) passes about the aforesaid type-wheels and is supported by four tubular antifriction-rollers 29, extending across the printer-frame and journaled at their outer ends on pins 29$^a$, fixed in the plate 10$^a$, and at their inner ends on similar pins mounted upon the main frame, as shown in Fig. 1.

A guard-plate 31, Fig. 26, holds the inking-ribbon away from the check-strip hereinafter described and is suitably apertured in proximity to the printing positions of the types to permit of impressions being taken through it at these points. This plate is supported in position upon the two lower rollers 29. (See Fig. 4.)

A ribbon-feeding roller 32 (see Figs. 2 and 4) is also journaled in the printer-frame and has a roughened or milled surface over which the ribbon passes. The latter is held firmly against the roller 32 by a rubber roller 32$^a$, which is journaled between the arms of a depending yoke 32$^b$. The yoke is journaled upon a transverse rod or shaft 49 and normally forced forward by a coil-spring 32$^c$, surrounding said rod and secured at one end thereto. The opposite end of said spring bears against a projection 32$^d$ of said yoke, as shown in Figs. 3 and 4. The said feeding-roller is provided at its right-hand end with a flanged disk 34, having a laterally-projecting pin 35 mounted thereon. (See Fig. 10.) This pin is so located as to be engaged and forced forward by a similar pin 36, which projects laterally from a ratchet-wheel 37, mounted on a journal 37$^a$, which is secured to the main frame and also acts as a supporting-trunnion for the inner end of the roller 32, into which it projects. The ratchet-wheel 37 receives a step-by-step movement from a pivoted spring-pressed pawl 38, which is mounted on a lever 39, (see Fig. 4,) the latter being in turn suitably pivoted upon the transverse shaft 39$^a$. The lower end of this lever is provided with a pivoted link 40, which is connected to a crank-arm 41, fast to the sleeve 23$^a$, whereby the latter is rocked upon each operation of the lever to actuate the operating-pawls 22 for the consecutive-numbering wheels, as hereinbefore described. The said ratchet-wheel 37 is held against any backward movement by a spring-pressed retaining-pawl 42, suitably mounted on the main frame so as to engage said wheel. (See Fig. 10.)

The aforesaid lever 39 is formed at its upper end with a hook 43, into which projects a pin 44, mounted on a platen-bar 45, whereby the said lever is operated upon the movement of said platen-bar, Fig. 4. This bar is recessed to receive an impression-bar 45$^b$, which is provided with a platen 45$^c$ and is held in position in the platen-bar by screws 45$^d$, which pass through said latter bar and screw into said bar 45$^b$. Coil-springs 45$^e$ surround said screws and bear with their opposite ends against the respective bars, so as to normally hold them apart, but permit of the impression-bar being forced back when the platen is forcing the record-strip into engagement with the type-wheels.

The platen is supported above the printing-wheels by two arms 47 and 48, which are both fast upon the transverse rock-shaft 49, so as to move together. Motion is imparted to one of the said supporting-arms to depress the platen and force the record-strip 50 against the printing-wheels by devices hereinafter fully described.

The record-strip is mounted upon a supply-roller 51, which is formed at its opposite ends with shallow recesses into which fit trunnions 54 and 55. (See Figs. 3 and 17.) The trunnion 54 is slidably mounted in a bracket 56, secured to the printer-frame plate 1$^a$, Figs. 1 and 3, and is normally forced forward into engagement with the wooden roller 51, upon which the record-strip is wound, by a coil-spring 57, which surrounds it and bears with its opposite ends against the plate 1$^a$ and a washer 58, fast on said trunnion. The latter forms a tension device for the roller 51, as it creates sufficient friction to slightly retard the movements of the roller when the record-strip is being drawn therefrom.

The opposite end of the supply-roller is supported by the protruding end of the short rigid journal shaft or trunnion 55, rigidly mounted on the main frame. A washer or collar 60 is fast to said shaft (see Fig. 17) and holds a gear-wheel 61, which is journaled on said shaft, in its proper position. This gear carries a guard-disk 62 and a ratchet-wheel 63, the latter being engaged and operated by a spring-pressed pawl 64, (see Fig. 4,) pivoted upon an arm 65, which is journaled upon the trunnion 55. This arm receives its motion from a link-bar 66, which is pivotally connected to the same and to the aforesaid platen-arm 47, so as to be moved with the latter. A gravity-pawl 67, mounted on the main frame, also engages the ratchet-wheel 63 for preventing any backward movement of the same.

It will be observed from the above that the ratchet-wheel 63 is moved forward one tooth at each operation of the machine, and thus feeds the aforesaid record-strip correspondingly by means as follows: The gear-wheel 61 meshes with an intermediate gear 68, journaled on a transverse rigid shaft 69, and this wheel 68 in turn meshes with a gear-wheel 70, fast to a hollow shaft 70$^a$ of a rubber friction feeding-roller 71. This shaft 70$^a$ is journaled upon a rod 70$^b$, which has its opposite ends fixed in the outer ends of arms 72, which are pivotally mounted upon the shaft 69. (See Figs. 1 and 4.) One of the said arms 72 is connected to the main frame by a coil-spring 73, so as to normally exert an upward tension on the said arm and feeding-roller which it supports, and thus hold said roller firmly against the periphery of the roll formed by the record-strip which is being wound upon a storing-roller 74.

It will be seen from the above description that the gears 68 and 70 always remain in mesh no matter what position the roller 71 may assume, as the supporting-arms for said roller are fulcrumed on the same shaft with said gear 68.

The storing-roller 74 is supported at one end by a spring-pressed tension-trunnion 75, similar to that which supports the supply-roller, and at its opposite end by a rigid trunnion 76, mounted on the main frame. One end of said roller is provided with a milled collar or thumb-nut $76^a$, whereby the said roller may be turned at will. (See Fig. 15.) A split sleeve 77 is loosely mounted upon said roller and is limited in its movements thereon by a pin 78, mounted on the roller and projecting into an elongated slot 79, formed in said sleeve. The roller has also a reduced flat side, as at 80, so that when the split portion of the sleeve is brought into alinement with this flattened side the end of the record-strip may be readily inserted through the split in the sleeve and then clamped in position by moving the roller out of such alining position by means of the aforesaid thumb-nut.

By the above-described means the record-strip is fed forward equally at all times no matter how large the storing-roll may become, as the feed is accomplished from the periphery of said storing-roll.

The platen-arm 48, hereinbefore mentioned, is provided with an extension or crank arm 81, (see Fig. 2,) formed at its outer end with gear-teeth which mesh with similar teeth formed on an arm 82. This latter arm is formed integral with a collar 83, which is journaled upon an extension end or cap 92 of a printing-drum 84, hereinafter more fully described. Said collar is also provided with a pendent integral arm 85, having a laterally-projecting antifriction-roller 86 at its lower end. This roller projects into the cam-groove 87 of a disk 88, fast upon the outer end of a transverse power-shaft 89, which receives motion through suitable gearing connecting it with the movable parts of the machine, as hereinafter more fully described.

From the above it will be observed that the platen $45^c$ is actuated each time the machine is operated, and the record-strip thus receives an impression at every operation of the machine whether or not the check devices hereinafter described are operated.

The electrocylinder, (see Fig. 5,) which is arranged to print upon a check-strip any desired information—such as an advertisement, a rebate notice, or the like—comprises a cylinder proper, 90, and two oppositely-arranged end caps 91 and 92. A flange 93 is formed about one end of the cylinder and is adapted to receive the cap 91, which is secured in position therein by suitable screws which enter the end of the cylinder. (Not shown in the drawings.) This cap is centrally apertured to receive a journal-stud 94, which is rigidly mounted on the main frame and is provided at its inner end with a head 95, in which is fixed a pin 96. (See Fig. 7.) Said cap is further provided with a gear-wheel 97 fast thereto, whereby the cylinder is rotated, as hereinafter more fully described. The stationary pin 96 projects into an elongated slot 98, formed in a lever 99, which is fast to a shaft 100, journaled in and extending through the cylinder. It will be observed that by this construction each rotation of the cylinder will cause the shaft 100 to be rocked or oscillated. The end of said shaft opposite from that carrying the lever 99 projects into a hollow chamber formed in said cylinder and is provided with a stud 101 and a crank-arm 102, which latter is provided with an operating-stud 103. The stud 101 projects into the end of a tube 104, upon which consecutive-numbering type-wheels 105 are mounted, while the stud 103 projects through the arm 106 of the operating-yoke 107, which has its opposite ends journaled on said tube so as to straddle the numbering-wheels. We designate the type-wheels 105 as "check-numbering" wheels, because they are arranged to print the number of each check upon the front side thereof. If the machine be operated without issuing checks, the check-numbering wheels are meanwhile not moved. The consecutive-number-printing wheels 19, however, continue always to print the transaction upon the detail-strip.

The wheels 105, which are loose upon the tube 104, are provided with ratchet-wheels 108, (see Fig. 21,) each of which except the highest has a deep notch $108^a$ formed in its periphery. A spring-pressed block 109, carrying a plurality of rigid graduated pawl-arms 110, is pivotally mounted in the yoke 107, (see Figs. 6 and 7,) so that said arms lie in proximity to their respective ratchet-wheels and engage and operate the same when the yoke 107 is operated by the arm 102 substantially in the same manner as the pawls 22 of the consecutive-numbering wheels heretofore described. As this operation of the counter-wheels is old and well known in the art, no further description of the same is deemed necessary. Each of said ratchet-wheels 108 is engaged by an independent pawl 111, as shown in Fig. 4, said pawls being pivotally mounted upon a rod 112, secured in said cylinder. These pawls are each provided on one side with a pin 111ª, which holds one end of coiled springs 112ª. The opposite ends of said springs are held by similar pins carried by a yoke-plate 112ᶜ, pivoted on the rod 112 and held in position by the wall of the cylinder, which it engages. The said type-wheels 105 are so located as to extend through a suitable opening formed in the side of the printing-drum, and thus project into the proper position to print the consecutive number in connection with the printing done by any suitable electrotype secured upon the drum in the usual manner. A suitable comma-printing type-disk 110ª, formed with a series of comma-printing types, (see Fig. 6,) is mounted between two of the wheels 105 and is fast to one of the same, so as to print a comma between the hundred and thousand wheels.

In order to turn the wheels 105 to zero when so desired, I provide each with a spring-pressed pawl 114, the end of which normally engages the sleeve 104, so as to snap into a groove formed therein when said groove is brought into alinement with the pawls. The sleeve is turned to bring the groove into such alinement and then to move the type-wheels to zero by a rod 115, rigidly connected thereto and projecting out through the cap 92. The outer end of said rod is formed with a screw-threaded recess 179, adapted to receive a headed screw 180, which in turn is arranged to secure a thumb-nut 181 loosely (with respect to longitudinal movement) in position upon said rod. (See Fig. 20.) The inner end of this nut is formed with a recess 182, into which projects the outer end of a pin 183, fastened in the rod 115. By this means the rod is turned with the nut, but the latter is free to be moved longitudinally independently of said rod. A coiled spring 184 surrounds said rod and bears with one end against the head of the screw 180 and the other against an internal shoulder formed in the nut. The nut is thus normally drawn toward the drum, so that a stop-pin 185, mounted on said drum, will project into the said recess 182, and thus lock the said nut against rotation.

When it is desired to turn the wheels to zero, the nut is first drawn out against the tension of its spring until the pin 185 clears the recess 182 and then turned, with the inner end of said nut bearing against said pin. When all of the type which print nine have been brought to the printing position, the nut again becomes locked by snapping inward, so that the pin 185 again projects into the recess 182. The next operation of the pawl-carrying block will cause the operating-pawls to turn all of the type-wheels to the zero position.

The aforesaid cap 92 is secured in the end of the drum in substantially the same manner as the cap 91, but is provided with a journal extension 116, which has a bearing in the printer-frame.

The electrotype-plate, which in practice is fitted about the surface of the cylinder 90, as well as the consecutive-numbering wheels 105, are inked by an absorbent inking-roller 117, which is mounted on a shaft 118. (See Figs. 2 and 4.) This shaft has its opposite ends mounted in elongated slots 119, formed in the frame, and is normally forced upward into engagement with the printing-cylinder 90 by spring-pressed plungers 120, suitably mounted in said frame so as to project into said slot and engage the ends of said shaft.

The check-strip 121, which is wound upon a supply-roller 122, journaled in the frame, is fed up through a curved channel 123, so as to pass between the printing-cylinder and a rotary rubber platen or drum 124. This platen is suitably journaled upon a rigid transverse shaft 125 and is provided at one end with a gear-wheel 126, which meshes with the gear-wheel 97 on the printing-cylinder, so that the cylinder and platen will move together. The drum 84 is provided near its opposite ends with feeding-flanges 84ª, so arranged as to engage and feed the check-strip both before and after the printing of the amount. The gear-wheel 126 further meshes with a gear-wheel 127, journaled upon the short rigid shaft 128, mounted on the frame, and this wheel 127 in turn meshes with a gear-wheel 129, fast on a sleeve 130, Fig. 4. Said sleeve is loose upon the power-shaft 89 and is arranged to be coupled thereto at will in the following manner: A cam-disk 131 (see Figs. 4, 8, 14, and 19) is fast to said sleeve and is formed in its outer side with a cam-groove 132, the purpose of which will be hereinafter described, and also with a laterally-projecting clutch-stud 133, Fig. 8. This stud is arranged to coöperate with a similar stud 134, carried by a clutch-disk 135, Fig. 14, which is loosely mounted on said power-shaft by means of a spline and feather, so that it may slide freely thereon in a longitudinal direction, but be incapable of any independent rotary movement. This clutch-sleeve is normally forced to one side to hold the stud 134 out of the path of the pin 133 by a coiled spring 132ª, which surrounds the shaft 89 and bears against the said clutch and the disk 131. A cam-disk 136, Fig. 8, is mounted fast on said shaft 89 and is formed with a beveled recess 89ª, the cam-wall of which is arranged to coact with a stud 137, mounted on the lower end of a supporting-link 138 to force said stud laterally, and thus cause it to engage and operate the clutch-disk 135 to bring the studs 133 and 134 into the same plane of movement. The upper end of said link 138 is pivotally connected to a pivoted hanger 139, suitably mounted on the main frame, whereby said pin may be moved forward or backward or from side to side. Forward movement is imparted to the supporting-link by a slidable bar 140, suitably mounted on the main frame by pins 139ª, which project through slots 139ᵇ, formed in the same. Said bar carries at its rear end a pin 140$^a$, which projects into a slotted plate 140$^b$, formed on the supporting-link 138. (See Fig. 14.) The bar 140 is normally drawn forward by a coiled spring 140$^c$, so that the pin 137 is in its inoperative position in relation to the cam 136, as shown in said Fig. 14.

When it is desired to issue a check, the bar 140 is forced rearward by a pin 140$^d$, mounted on a special check-key 140$^e$, and thus forces the pin 137 against the cam-wall of the recess 89$^a$ of the cam 136, so that the pin is forced laterally and moves the clutch-disk to bring the studs 133 and 134 into the same vertical plane, which results in the feeding of the check-strip, as before described.

The key 140$^e$ is mounted in the same bank with the special keys 2 and in a manner similar to said keys, with the exception that it does not coact with the usual detent, but returns to normal position when the pressure upon it is relaxed.

In order to hold the bar 140 in its "set" position after the key 140$^e$ has been released, we form said bar with a latching-nose 140$^f$, which coöperates with a stud 140$^g$, mounted on a pivoted lever 140$^h$. This lever is normally drawn downward at its forward end by a spring 140$^i$, whereby when the bar 140 is forced inward the nose 140$^f$ will pass under said stud and become locked back of the same. The pivoted lever 140$^h$ is operated to disengage the stud 140$^g$ from the nose 140$^f$ by a cam 141$^a$, mounted on one of the rotation-shafts 141$^b$ and arranged to depress a stud 141$^c$, carried by said lever.

The check-strip after passing the printing-drum moves over the lower platen 141, which is similar to the before-mentioned upper platen and is supported in position by two arms or levers 142 and 143. (See Fig. 18.) The lever 142 is journaled on a sleeve 144, which is mounted on the journal-stud 94, while the lever 143, which is of bell-crank formation, is journaled on the extension of the cap 92. (See Figs. 2, 4, and 24.) The lower arm of this bell-crank lever is provided with a laterally-projecting antifriction-roller 145, which projects into a cam-groove 146, formed in a cam-disk 147, fast to the sleeve 130.

It will be observed from the above description that as the lower platen is operated by the cam-disk 147 and as said disk is fast to the sleeve 130, which is controlled by the clutch, the said platen will not be operated when the clutch is thrown off by the operation of the check-key, and the check-strip will therefore not be forced against the type-wheels.

When the machine is operated after the check-key has been depressed, two numbers will be printed on the check, one representing the number of the check and the other the customer or transaction number, while the record-strip will receive the customer-number only. This double consecutive number is necessary in order to preserve the customer or transaction number when the check-numbering wheels cease to operate by the check being turned off, as above described.

The cam-disk 131, the operation of which is controlled by the check-key clutch, as before described, is formed with a cam-groove 132, into which projects an antifriction-roller 149, mounted on the end of a bell-crank lever 150, which latter is pivotally mounted upon the shaft 125. (See Fig. 4.) The forward end of this lever is bent at an angle and is pivotally connected to an operating-bar 151, which is pivoted at its upper end to a link 152. (See Fig. 25.) This link, together with a similar link 153, is pivoted to a knife-blade 154 and also to a transverse bar 155, forming part of the frame. (See Figs. 1 and 11.) The locations of the said links 152 and 153 are such that when the bar 151 is operated the knife-blade will be drawn diagonally downward, and thus effect a shearing cut.

The blade 154 coöperates with a stationary blade 155$^a$, which is suitably secured in a cross-bar 156 of the frame, a suitable guide-plate 157 being arranged on said cross-bar 156 to guide the check-strip between the said blades. (See Fig. 26.) One end of the said movable blade 154 is formed with a pendent nose 159, having a lower inclined edge which is adapted to strike and move downward a spring-pressed pawl 160, mounted on a pivoted lever 161, which is fulcrumed at 161$^a$. (See Fig. 1.) The pawl is normally held by the spring against the pin 162, which is also mounted on said lever 161, so that when the blade 154 descends the nose 159 will strike the pawl 160, and thus depress the lever until the said nose 159 swings so far to the left that it passes entirely over the pawl, and thus allows it and the lever 161 to spring back to normal position. Upon the return stroke of the blade 154 the nose 159 pushes the said pawl to one side against the tension of its spring, and thus passes the same, when the pawl snaps under said nose again, ready for the next operation.

The right-hand end of the lever 161 is formed with a slot 163, which receives a pin 164, mounted on a platen-lever 165, which in turn is pivotally mounted upon the frame of the machine. The said platen-lever is provided with a platen 165$^a$, having an elastic facing, and is normally forced downward by a coil-spring 166. This spring bears with one end against a nose 166$^a$, formed on the platen-lever, and has its opposite end mounted in a recess formed in a shoulder 166$^b$ of the main frame. It will be seen from the above that this platen-lever is raised against the tension of its spring by the lever 161 and then allowed to suddenly descend under the reaction of said spring when the said lever is released, as above described.

Just below the platen 165ᵃ is arranged an apertured supporting and guard plate 167, (see Fig. 3,) arranged to hold the check-strip in the proper position in relation to the platen and separated from the endless inking-ribbon 168. The latter, as shown in Fig. 1, is supported by antifriction-rollers 169, suitably mounted on the frame, and also by an absorbent inking and feeding roller 170, (see Fig. 4,) which latter is provided with a feeding ratchet-wheel 171. A spring-pressed locking-pawl 172, mounted on the frame, engages said wheel and prevents backward movement of the same, while a spring-pressed pawl 173, pivoted on the bar 151, also engages said wheel and feeds the same forward at each operation of the machine, and thus imparts the desired movement to the ribbon.

Just below the opening in the plate 167 is arranged a rigid dial-plate 174, (see Fig. 9,) having types representing the numerals and divisions of the face of a clock. The dial is apertured to accommodate a revoluble ring 175, carrying a type in the form of an arrow-point, and a central disk 176, carrying a type in the form of an arrow or clock-hand. A suitable clock mechanism 177 is arranged below the plate 174, and suitable gearing provided for connecting the hour-shaft with the disk 176 and the minute-wheel with the ring 175. As these devices last mentioned are well known in the art of time-stamps, no further illustration or description is here thought necessary. The main power-shaft 89, as well as the cam-shaft 141ᵇ, are connected together and to the operating-handle by any suitable gearing, as shown in Figs. 1 and 12. The sleeves 6, which support the amount-printing wheels, are operated in connection with the keys and other parts of the machine, as shown in Fig. 13 and as more fully shown and described in the aforesaid patent to Cleal and Reinhardt. It will be seen from the above that the said disk and ring will be moved, respectively, according to the movements of the hour and minute devices and will accordingly always be set to print the exact time in connection with the aforesaid clock-dial. The inking-ribbon 168, which passes over the dial and other clock-types, is held taut by a spring-pressed tension roller 178, which is mounted on the frame and engages said ribbon under spring tension.

It will be observed from the above description that the check resting on the plate 167 will receive the stroke of the platen 165ᵃ and will thus be forced down upon the inking-ribbon, which in turn will be forced into contact with type of the clock-face, and thus an impression of the exact condition of the clock-dial and hands or pointers will be made upon the check just as the same is severed from the check-strip by the action of the knife as aforesaid.

By means of the peculiar construction and operation of the consecutive-numbering devices we are enabled to retain the customer-number at all times, regardless of whether or not checks are being printed, and at the same time have the checks numbered according to the exact number issued.

In all kinds of cash-registers it is desirable to be able to tell at a glance the number of customers who have been waited on, and so long as checks are issued continuously the consecutive number on the check will enable this to be done; but in prior machines no provision has been made for carrying on the count when the issue of checks is stopped. In our machine, however, the check-numbering device is also stopped; but the transaction-numbering device is not interfered with and continues at all times to print the transaction-number upon the detail-strip, whereby the check-number at all times shows the number of checks that have been issued and the transaction-number shows likewise the number of transactions that have been recorded upon the machine.

Having thus described our invention, what we claim as new, and desire to secure by Letters Patent, is—

1. In a cash-register, the combination with devices for printing the amount registered, a check-strip, a knife for severing a check from the strip, a platen mounted independently of the knife, and movable means connecting the knife and platen whereby the operation of one causes the movement of the other.

2. In a check-printing cash-register, the combination with the type-carrier and coöperating devices for printing the amount of a recorded transaction upon the detail-strip, feed-rollers for leading the check to the type-carriers to receive an impression therefrom, a time-stamp for printing the time of the transaction upon the check-strip after it has received its impression from the type-carriers and means located between the time-stamp and the type-carriers for cutting off the printed end of the check-strip.

3. In a cash-register, the combination with type-carriers and coöperating devices for printing the amount of a recorded transaction, means for actuating the type-carriers and coöperating devices to print the amount of the recorded transaction upon the check-strip, a time-stamp and means for feeding the check-strip first to the type-carriers and then from the type-carriers to the time-stamp and for automatically operating the time-stamp to print the time of the recorded transaction upon the check-strip.

4. In a cash-register, the combination with the type-carriers and coöperating devices, of feed-rollers arranged to lead a check-strip to said type-carriers and operating devices, means for operating the type-carriers to thereupon print upon the check-strip the amount of the recorded transaction, a time-stamp, a knife, and means for leading the check-strip from the type-carriers to the time-stamp and knife and for operating the time-stamp and knife after the operation of the type-carriers to print the time of the recorded transaction upon the check-strip and to sever the printed end thereof.

5. In a cash-register, the combination with a registering mechanism, of devices for printing the amounts registered, a stationary knife-blade, a movable blade coöperating therewith, a pivoted lever arranged to be operated by said movable blade, a platen which receives motion from said lever, and a time-printing device coöperating with said platen.

6. In a cash-register, the combination with a printing mechanism, of two independent consecutive-number-printing devices, one of which is arranged to print upon both a check and a detail-strip and the other upon the check alone.

7. In a check-printing cash-register, the combination with feeding devices for the check-strip, of a knife for severing a check therefrom, a clock mechanism, printing-types connected to the same, a platen mounted independently of the knife for forcing a check into contact with said types, and movable means connecting said platen and knife so that they move together.

8. In a cash-register, the combination with devices for printing the amounts registered, of a printing-cylinder, a number of consecutive-numbering wheels mounted in said cylinder, a frame carrying pawls for operating said wheels and a crank-shaft mounted in said cylinder and arranged to operate said frame.

9. In a check-printing cash-register, the combination with a common operating mechanism, of devices for printing the amount registered, consecutive-numbering wheels having corresponding types upon diametrically opposite sides so as to print upon both a record-strip and a check, a knife for severing the check-strip and a time-printing device arranged to print upon the check alone.

10. In a cash-register, the combination with devices for printing the amounts registered, of a series of consecutive-number-printing wheels, a series of check-numbering wheels, a power-shaft, means for operating the consecutive-number-printing wheels from said shaft, devices for operating the check-number wheels loosely mounted on said shaft, a clutch for connecting these latter devices with the shaft and a check-key for controlling said clutch.

11. In a cash-register, the combination with devices for printing the amounts registered, of a series of consecutive-number-printing wheels arranged to print on both a record-strip and a check-strip, a series of check-numbering wheels arranged to print upon the check-strip alone, a power-shaft, two independent platens for the respective series of wheels, means for connecting the platen of one series permanently to the power-shaft, and a clutch device for connecting the other platen to the shaft.

12. In a cash-register, the combination with devices for printing the amounts registered, of a series of consecutive-number-printing wheels adapted to print duplicate impressions simultaneously upon a record-strip and a check-strip, platens located respectively on opposite sides of said wheels, a power device permanently connected to one of said platens and clutch devices between the remaining platen and the power device whereby it may be coupled or uncoupled at will.

13. In a cash-register, the combination with type-carriers for printing the amounts registered on both a record-strip and a check-strip, movable platens coöperating with said type-carriers at different points, a power device permanently connected to one of said platens, independent means for connecting the remaining platen to the power device and including movable coupling devices whereby this latter platen may be coupled or uncoupled at will.

14. In a cash-register, the combination with type-carriers for printing the amounts registered on both a record-strip and a check-strip, two platens pivoted upon the opposite sides of said type-carriers, a rotary power-shaft, a cam actuated thereby, a lever connected to one of said platens and having a projection which coöperates with the cam, a second cam loose on said shaft, a clutch for connecting this latter cam to said shaft at will, and a lever connecting this cam to the other platen.

15. In a cash-register, the combination with wheels for printing the amounts registered on both a record-strip and a check-strip, platens above and below said wheels, a power-shaft, means for operatively connecting one of said platens permanently to said shaft, a sleeve loose on said shaft, a clutch for connecting said sleeve to said shaft at will, a time-printing device, a platen therefor, a knife for cutting the check-strip and means connecting the latter platen and the said knife to the said sleeve.

16. In a cash-register, the combination with type-carriers, of a pivoted platen-lever carrying a pin, a pivoted operating-lever having a slot into which said pin projects, a pivoted pawl mounted on said operating-lever and a check-knife arranged to engage and operate said pawl.

17. In a cash-register, the combination with the type-carriers, of a pivoted platen-lever, a check-knife and an operating-lever for the platen-lever carrying a movable pawl which is operated by the knife mechanism.

18. In a cash-register, the combination with the type-carriers, of operating devices, a clutch for connecting said type-carriers and operating devices, a pivoted lever for shifting said clutch, a slide for operating said lever, a check-key for operating said slide, and a latch for said slide arranged to be tripped by the operating devices.

19. In a cash-register, the combination with a check-printing mechanism, of operating devices, a clutch between said operating devices and printing mechanism, a check-key, a slide arranged to be operated by said key, means operated by said slide for setting the clutch and a latch for the slide arranged to be tripped by the operating devices.

20. In a cash-register, the combination with devices for printing the amounts registered, of a clock mechanism, time-printing types connected to said mechanism, a check-cutting device, and means for moving the check-strip forward after receiving a printing impression from the amount-printing devices so as to subsequently receive the impression from the time-printing types, and mechanism for operating the cutting device at a time intermediate the two impressions.

21. In a cash-register, the combination with devices for printing the amounts registered, of a clock mechanism, a type representing a clock-dial, type-pointers connected to the clock mechanism and coöperating with the clock-dial, and means for causing the check to be moved forward after receiving an impression from the amount-printing devices so as to subsequently receive the impression from the time-printing types.

22. In a cash-register, the combination with printing devices, of a check-knife hung on pivoted links, a pivoted lever, a cam for operating said lever, a link connecting said lever to the knife, an inking-ribbon and a pawl mounted on the connecting-link and arranged to feed said ribbon.

23. In a cash-register, the combination with printing devices, of a knife hung by pivoted links so as to have a shearing movement, a lever carrying a pivoted pawl arranged to be struck by said knife, a spring-pressed platen-lever and means connecting said platen-lever and the said pawl-carrying lever.

24. In a cash-register, the combination with printing devices, of a movable knife, a pivoted lever carrying a pawl which is arranged to be struck and operated by said knife, a pivoted spring-pressed platen-lever and a projection on said latter lever arranged to engage the first-mentioned lever.

25. In a cash-register, the combination with devices for printing the amounts registered, of a printing-cylinder, check-numbering wheels mounted in said cylinder, a rock-frame carrying pawls for operating said wheels, a crank-shaft mounted in the drum and arranged to operate said frame, and a stationary projection arranged to operate the crank-shaft when the cylinder is rotated.

26. In a cash-register, the combination with devices for feeding a check, of a knife for severing the check, pivoted links supporting said knife so that it has a shearing cut when depressed, a clock mechanism, printing-types connected to the clock mechanism, a platen for forcing the check into contact with said types, a pivoted lever arranged to be operated by the knife and means connecting said lever and platen.

27. In a cash-register, the combination with a registering mechanism, of devices for printing the amounts registered, a stationary knife-blade, a movable knife-blade, a pivoted lever arranged to be operated by said movable blade, and a platen actuated by said lever.

28. In a cash-register, the combination with a printing mechanism, of a series of consecutive-number-printing wheels having duplicate numerals upon opposite sides arranged to print respectively upon a detail-strip and a check-strip, and a check-numbering device arranged to print upon the check-strip alone.

29. In a cash-register, the combination with a printing mechanism, of two consecutive-number-printing devices, a check-feeding mechanism, a check-key, and means connected to said key for simultaneously controlling the feeding of the check and the operation of one of the consecutive-numbering devices.

30. In a cash-register, the combination with a printing mechanism, of two independent consecutive-number-printing devices, a strip-feeding mechanism and means for simultaneously turning off the feeding mechanism and one of the consecutive-numbering devices without disturbing the remaining numbering device.

31. In a cash-register, the combination with a check and detail strip printing mechanism, of a series of consecutive-number-printing wheels arranged to make duplicate impressions at two different points simultaneously upon the check and detail strip, and a time-printing device arranged to print upon the check which has received one of said duplicate impressions.

32. In a cash-register, the combination with a printing mechanism, of a check-strip device, a knife for severing a check therefrom, a platen and means connecting the knife and platen whereby the operation of the former causes the movement of the latter.

33. In a cash-register, the combination with a printing mechanism, of a check-strip device, a knife for severing a check from the check-strip, a lever operated by said knife and a platen connected to and operated by said lever.

34. In a cash-register, the combination with a printing mechanism, of a check-strip device, a knife for severing a check from the check-strip, a lever operated by said knife through a portion of its stroke and then released while the knife continues its movement and a platen connected to said lever.

35. In a cash-register, the combination with a printing mechanism, of a check-strip device, a knife for severing a check from the strip, a platen, and means connecting the platen and knife whereby said platen is actuated during a portion of the movement of the knife and then released while the knife continues its movement.

36. In a cash-register, the combination with a printing mechanism, of a check-strip device, a knife for severing a check from the strip, a lever arranged to be operated by said knife through a portion of the movement of the latter and then be released while said knife continues its movement, and a spring-pressed platen connected to and moving with said lever.

37. In a cash-register, the combination with a printing mechanism, of a check-strip device, a knife for severing a check from the strip, a pivoted lever carrying a pivoted pawl which coöperates with the check-knife, and a platen connected to and operated by said lever.

38. In a cash-register, the combination with a printing mechanism, of a check-strip device, a movable knife-blade swung on pivoted links, a lever arranged to be operated by said knife-blade and a movable platen connected to said lever.

39. In a cash-register, the combination with devices for printing the amounts registered, of a printing-drum, check-numbering wheels mounted in said drum, a frame carrying pawls for operating said wheels, a crank-shaft mounted in said drum and arranged to operate said frame, a slotted crank-arm mounted on said shaft and a pin mounted on the frame and projecting into the slot of said arm.

40. In a cash-register, the combination with devices for printing the amounts registered, of a printing-drum, check-numbering wheels mounted in said drum, pawls for operating said wheels, a crank-shaft for operating said pawls, a slotted arm fast to said shaft and a stationary pin projecting into the slot of said arm.

41. In a cash-register, the combination with devices for printing the amounts registered, of a series of consecutive-number-printing wheels, a series of check-numbering wheels, an operating mechanism, means for operating the consecutive-number-printing wheels connected to said operating mechanism, devices for operating the check-numbering wheels, a clutch connecting said latter devices with the operating mechanism, and a check-key for controlling said clutch.

42. In a cash-register, the combination with a printing mechanism, of operating devices, a clutch between said operating devices and printing mechanism, clutch-operating devices, a slide for moving said clutch-operating devices, a key for operating said slide and a latch for said slide arranged to be tripped by the operating devices.

43. In a cash-register, the combination with a printing mechanism, of operating devices, means for throwing the printing mechanism into and out of connection with said operating devices, a slide for controlling said means, a key for operating said slide, and a latch for said slide controlled by the operating devices.

44. In a cash-register, the combination with operating devices, of a printing mechanism, means for throwing the printing mechanism into and out of connection with said operating devices, a slide for controlling said means, a spring for normally drawing the slide forward, a key for forcing the slide rearward and a latch coöperating with the operating devices and arranged to hold the slide in its rearmost position.

45. In a cash-register the combination with a printing mechanism movable platens coöperating with said mechanism, an operating device permanently connected to one of said platens, independent means for connecting the remaining platen to the operating device and including movable coupling devices whereby this latter platen may be coupled or uncoupled at will.

46. In a cash-register the combination with type-wheels having duplicate sets of types movable platens coöperating with said wheels at opposite points, a power device permanently connected to one of the said platens, independent means for connecting the remaining platen to the power device and including movable coupling devices whereby this latter platen can be coupled or uncoupled at will.

47. In a check-printing cash-register, the combination with the printing mechanism, feeding devices for feeding a check to the printing mechanism, a time-stamp for printing the time of the transaction upon the check after it has received its impression from the regular printing mechanism and operating means for cutting off a printed check and concurrently operating the time-stamp.

48. In a cash-register the combination with a printing mechanism, of two independent consecutive-numbering devices one of which is arranged to be advanced at every operation of the machine and the other one at will as predetermined before each operation of the machine.

49. In a cash-register the combination with a printing mechanism including check-issuing devices arranged to be adjusted to issue checks or not as desired and two consecutive-number-printing devices, one of which is actuated upon each operation of the machine and the other only when checks are issued.

50. In a cash-register the combination with a printing mechanism including devices for causing checks to issue or not as desired, of two independent consecutive-number-printing devices, one of which is arranged to be operated to print upon both a check and detail strip the number of times the machine has been operated, the other being arranged to print upon the check alone, the number of checks issued.

51. In a cash-register, the combination with a printing mechanism, of a consecutive-number-printing device having duplicate sets of types whereby duplicate numbers may be printed upon two separate slips, a second set of consecutive-numbering devices having a single set of types for printing on one of the slips only, and means for preventing the operation of the latter consecutive-numbering device at will.

52. In a cash-register, the combination with a printing mechanism, of a printing-cylinder, numbering-wheels mounted in the cylinder, operating devices for the numbering-wheels including operating-pawls, a rock-shaft and a slotted arm connected to the shaft, and a stationary projection arranged to engage the slotted arm to operate the numbering-wheels when the cylinder is rotated.

53. In a cash-register, the combination with a printing mechanism, of a printing-cylinder, consecutive-numbering wheels mounted in the cylinder, a rock-shaft and connections for operating said wheels, a slotted arm connected to the rock-shaft, and a stationary projection extending into the slot of said arm whereby the consecutive-numbering wheels are advanced upon each operation of the cylinder.

In testimony whereof we affix our signatures in the presence of two witnesses.

JOSEPH P. CLEAL.
ALVAN MACAULEY.

Witnesses:
WM. H. MUZZY.
W. H. BOYD.

---

Correction in Letters Patent No. 788,453.

It is hereby certified that in Letters Patent No. 788,453, granted April 25, 1905, upon the application of Joseph P. Cleal and Alvan Macauley, of Dayton, Ohio, for an improvement in "Cash Registers," an error appears in the printed specification requiring correction, as follows: In line 127, page 7, the word "operating" should read *cooperating*; and that the said Letters Patent should be read with this correction therein that the same may conform to the record of the case in the Patent Office.

Signed and sealed this 16th day of May, A. D., 1905.

[SEAL.]

F. I. ALLEN,
*Commissioner of Patents.*